(12) United States Patent
Deng et al.

(10) Patent No.: US 9,678,969 B2
(45) Date of Patent: Jun. 13, 2017

(54) METADATA UPDATING METHOD AND APPARATUS BASED ON COLUMNAR STORAGE IN DISTRIBUTED FILE SYSTEM, AND HOST

(71) Applicant: Huawei Technologies Co., Ltd., Shenzhen (CN)

(72) Inventors: Liqun Deng, Shenzhen (CN); Junhua Zhu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/241,909

(22) Filed: Aug. 19, 2016

(65) Prior Publication Data

US 2016/0357740 A1 Dec. 8, 2016

Related U.S. Application Data

(63) Continuation of application No. PCT/CN2015/070051, filed on Jan. 4, 2015.

(30) Foreign Application Priority Data

Feb. 24, 2014 (CN) .......................... 2014 1 0063272

(51) Int. Cl.
*G06F 17/00* (2006.01)
*G06F 17/30* (2006.01)
*G06F 3/06* (2006.01)

(52) U.S. Cl.
CPC ........ *G06F 17/3012* (2013.01); *G06F 3/0638* (2013.01); *G06F 17/30091* (2013.01);
(Continued)

(58) Field of Classification Search
CPC ............... G06F 17/246; G06F 17/2288; G06F 17/30353; G06F 17/30356; G06F 17/30817
See application file for complete search history.

(56) References Cited

U.S. PATENT DOCUMENTS

2011/0231454 A1* 9/2011 Mack ................ G06F 17/30569
707/803
2014/0019405 A1 1/2014 Borthakur et al.

FOREIGN PATENT DOCUMENTS

CN          102055795 A      5/2011
CN          102411637 A      4/2012
(Continued)

OTHER PUBLICATIONS

Foreign Communication From a Counterpart Application, PCT Application No. PCT/CN2015/070051, International Search Report dated Apr. 1, 2015, 4 pages.
(Continued)

*Primary Examiner* — Truong Vo
(74) *Attorney, Agent, or Firm* — Conley Rose, P.C.

(57) ABSTRACT

A metadata updating method based on columnar storage in a distributed file system includes acquiring to-be-updated metadata in a data table, splitting data records of the data table into multiple row groups on a row basis, converting the data table into global file metadata and multiple row group files, where the row group file includes an actual data block, a data index block, a local metadata block, a metadata index block, and a file footer, determining whether the to-be-updated metadata belongs to the global file metadata, updating local metadata when the to-be-updated metadata does not belong to the global file metadata, and adding an updated local metadata block, an updated metadata index block, and an updated file footer to the multiple row group files according to updated local metadata. Dynamic updating of metadata saves time of executing an updating operation of this type and needed computing resources.

23 Claims, 12 Drawing Sheets

(52) U.S. Cl.
CPC .. *G06F 17/30185* (2013.01); *G06F 17/30194* (2013.01); *G06F 17/30238* (2013.01)

(56) References Cited

FOREIGN PATENT DOCUMENTS

| CN | 102609492 A | 7/2012 |
|----|-------------|--------|
| CN | 102857570 A | 1/2013 |

OTHER PUBLICATIONS

Foreign Communication From a Counterpart Application, PCT Application No. PCT/CN2015/070051, Written Opinion dated Apr. 1, 2015, 3 pages.
Partial English Translation and Abstract of Chinese Patent Application No. CN102609492, Sep. 8, 2016, 4 pages.
Foreign Communication From a Counterpart Application, PCT Application No. PCT/CN2015/070051, English Translation of International Search Report dated Apr. 1, 2015, 2 pages.
Foreign Communication From a Counterpart Application, PCT Application No. PCT/CN2015/070051, English Translation of Written Opinion dated Apr. 1, 2015, 6 pages.
He, Y., et al., "RCFile: A Fast and Space-efficient Data Placement Structure in MapReduce-based Warehouse System," XP31868527, IEEE 27th International Conference on Data Engineering, Apr. 11, 2011, pp. 1199-1208.
Graefe, G., et al., "A Hybrid page layout integrating PAX and NSM," XP55338463, 13 Proceedings of the 17th International Database Engineering & Applications Symposium, Oct. 9-11, 2013, pp. 86-95.
"Apache Parquet—Thrift metadata," XP055338947, Dec. 11, 2013, 7 pages.
"Apache Parquet—Format," XP055338702, Dec. 11, 2013, 5 pages.
"HDFS Architecture Guide," XP055339790, Apr. 8, 2013, 8 pages.
Foreign Communication From a Counterpart Application, European Application No. 15752007.3, Extended European Search Report dated Feb. 6, 2017, 8 pages.

\* cited by examiner

METADATA UPDATING METHOD AND APPARATUS BASED ON COLUMNAR STORAGE IN DISTRIBUTED FILE SYSTEM, AND HOST

CROSS-REFERENCE TO RELATED APPLICATIONS

This application is a continuation of international patent application number PCT/CN2015/070051 filed on Jan. 4, 2015, which claims priority to Chinese patent application number 201410063272.6 filed on Feb. 24, 2014, both of which are incorporated by reference.

TECHNICAL FIELD

The present disclosure relates to the data processing field, and in particular to a metadata updating method and apparatus based on columnar storage in a distributed file system, and a host.

BACKGROUND

Unlike a conventional file system that supports an operation of modifying a file in place, an append-only file system is a file system that supports only a read or an append operation on a file. A file system of this type features high write performance, easy consistency among multiple copies, and the like, and is widely used in a large-scale distributed storage system. Typical examples include a GOOGLE file system (GFS), a HADOOP distributed file system (HDFS), and the like. Compared with conventional row-based storage, columnar storage in the append-only file system has distinct advantages. According to the columnar storage, data records are split on a column basis and independently stored such that data in a same column is of a same type is successively stored, which greatly increases a data compression rate and reduces data input/output (I/O) in a subsequent query operation. In addition, data in columns is separately stored, and during a data query, only data in a related column needs to be scanned and an unrelated column is directly ignored, which greatly improves performance of a query of this type.

According to the columnar storage in the append-only file system, newly added content is always appended to a tail of a file, which can be implemented only by overwriting, that is, an existing file is deleted, a new file is generated for a to-be-updated file, and file content is not allowed to be updated in place. A record columnar file (RCFile) is a data storage structure that can implement the columnar storage. The RCFile is designed and implemented on the basis of the HDFS. The RCFile organizes records per row group, where other row groups except the last row group have an equal size and each HDFS block can store multiple row groups. Inside each row group, data in columns is mutually independent and is successively stored, and metadata stores information, for example, location offsets of data of the columns and a byte length of each piece of data. Information about an Extensible Markup Language (XML) schema of a data table is stored in a third-party server, for example, MYSQL or DERBY. The Schema of the data table is stored in the MYSQL and therefore can be very conveniently modified using a HIVE of APACHE HIVE. However, the RCFile has a fixed file organization format, the metadata in the RCFile stores only simple information, for example, a quantity of data records and bytes of each column, but does not support any operation of dynamically updating data.

Therefore, according to the columnar storage in the existing append-only file system, an effective method for dynamically modifying metadata cannot be provided in an existing implementation manner. A metadata updating operation is highly costly because it requires regeneration and rewriting of all corresponding storage files, which results in extremely huge computing resource overhead and time consumption for large-scale data.

SUMMARY

In view of this, a purpose of the present disclosure is to resolve a problem that because an effective method for dynamically modifying metadata cannot be provided in an existing append-only file system, huge computing resource overhead and time overhead need to be consumed for a metadata updating operation, and a technical solution is as follows.

A first aspect of this application provides a metadata updating method based on columnar storage in a distributed file system, where the method includes acquiring to-be-updated metadata in a data table of the distributed file system, splitting data records of the data table into multiple row groups on a row basis, and converting the data table into global file metadata and multiple row group files, where the row group file includes an actual data block, a data index block, a local metadata block, a metadata index block, and a file footer, determining whether the to-be-updated metadata belongs to the global file metadata, updating local metadata if the to-be-updated metadata does not belong to the global file metadata, and adding an updated local metadata block, an updated metadata index block, and an updated file footer to the multiple row group files according to updated local metadata.

With reference to the first aspect, in a first possible implementation manner of the first aspect, updating local metadata includes generating a map task corresponding to each row group, and updating, using the map task, local metadata in the row group corresponding to the map task.

With reference to the first implementation manner of the first aspect, in a second possible implementation manner of the first aspect, updating, using the map task, local metadata in the row group corresponding to the map task and the adding an updated local metadata block, an updated metadata index block, and an updated file footer to the multiple row group files according to updated local metadata include determining a target data column related to the to-be-updated metadata, determining whether the to-be-updated metadata in the target data column needs to be calculated, generating a new metadata block if the to-be-updated metadata in the target data column does not need to be calculated, adding the new metadata block to a tail of the row group file, updating the metadata index block, adding the updated metadata index block to the tail of the row group file, updating a file offset of the metadata index block in the file footer, and rewriting the file footer according to the file offset of the metadata index block.

With reference to the first implementation manner of the first aspect, in a third possible implementation manner of the first aspect, updating, using the map task, local metadata in the row group corresponding to the map task and the adding an updated local metadata block, an updated metadata index block, and an updated file footer to the multiple row group files according to updated local metadata include determining a target data column related to the to-be-updated metadata, determining whether the to-be-updated metadata in the target data column needs to be calculated, calculating new metadata if the to-be-updated metadata in the target data column needs to be calculated, generating a new metadata block according to calculated metadata, adding the new metadata block to a tail of the row group file, updating the metadata index block, adding the updated metadata index block to the tail of the row group file, updating a file offset of the metadata index block in the file footer, and rewriting the file footer according to the file offset of the metadata index block.

With reference to the third implementation manner of the first aspect, in a fourth possible implementation manner of the first aspect, calculating new metadata includes scanning all records of a data block that is corresponding to the target data column in the actual data block, and performing corresponding statistical calculation.

With reference to the first aspect, in a fifth possible implementation manner of the first aspect, before a concurrent task is generated and executed and local metadata of all the row groups is updated, the method includes determining a location of the to-be-updated metadata, and generating a new metadata block if the to-be-updated metadata is metadata in the row group files, where the new metadata block includes a corresponding addition or deletion record result.

With reference to the fifth implementation manner of the first aspect, in a sixth possible implementation manner of the first aspect, generating a new metadata block includes adding a corresponding deletion record to a metadata block k when the deleted $k^{th}$ column exists, where the deletion record includes a column name and a deletion mark, generating a blank metadata block for a new column when the new column is added, and inserting a corresponding addition record into the metadata block, where the addition record includes a column name, an addition mark, and an optional default value.

With reference to the first aspect, in a seventh possible implementation manner of the first aspect, the method further includes modifying a file corresponding to the global file metadata if the to-be-updated metadata belongs to the global file metadata of the data table.

A second aspect of this application provides a metadata updating apparatus based on columnar storage in a distributed file system, where the apparatus includes an acquiring unit, a first determining unit, an updating unit, and a first processing unit. The acquiring unit is configured to acquire to-be-updated metadata in a data table of the distributed file system, split data records of the data table into multiple row groups on a row basis, and convert the data table into global file metadata and multiple row group files, where the row group file includes an actual data block, a data index block, a local metadata block, a metadata index block, and a file footer. The first determining unit is configured to determine whether the to-be-updated metadata belongs to the global file metadata, and trigger the updating unit if the to-be-updated metadata does not belong to the global file metadata. The updating unit is configured to update local metadata, and the first processing unit is configured to add an updated local metadata block, an updated metadata index block, and an updated file footer to the multiple row group files according to updated local metadata.

With reference to the second aspect, in a first possible implementation manner of the second aspect, the updating unit includes a map updating subunit configured to generate a map task corresponding to each row group, and update, using the map task, local metadata in the row group corresponding to the map task.

With reference to the first implementation manner of the second aspect, in a second possible implementation manner of the second aspect, the map updating subunit includes a data column determining submodule, a determining submodule, a metadata block generating submodule, a first updating submodule, and a second updating submodule. The data column determining submodule is configured to determine a target data column related to the to-be-updated metadata. The calculation determining submodule is configured to determine whether the to-be-updated metadata needs to be calculated, and trigger the metadata block generating submodule if the to-be-updated metadata does not need to be calculated. The metadata block generating submodule is configured to generate a new metadata block, and add the new metadata block to a tail of the row group file. The first updating submodule is configured to update the metadata index block, and add the updated metadata index block to the tail of the row group file, and the second updating submodule is configured to update a file offset of the metadata index block in the file footer, and rewrite the file footer according to the file offset of the metadata index block.

With reference to the first implementation manner of the second aspect, in a third possible implementation manner of the second aspect, the map updating subunit includes a data column determining submodule, a determining submodule, a calculating submodule, a metadata block generating submodule, a first updating submodule, and a second updating submodule. The data column determining submodule is configured to determine a target data column related to the to-be-updated metadata. The calculation determining submodule is configured to determine whether the to-be-updated metadata in the target data column needs to be calculated, and trigger the calculating submodule if the to-be-updated metadata in the target data column needs to be calculated. The calculating submodule is configured to calculate new metadata. The metadata block generating submodule is configured to generate a new metadata block according to calculated metadata, and add the new metadata block to a tail of the row group file. The first updating submodule is configured to update the metadata index block, and add the updated metadata index block to the tail of the row group file, and the second updating submodule is configured to update a file offset of the metadata index block in the file footer, and rewrite the file footer according to the file offset of the metadata index block.

With reference to the third implementation manner of the second aspect, in a fourth possible implementation manner of the second aspect, the calculating submodule includes a statistics collecting submodule configured to scan all records of a data block that is corresponding to the target data column and in the actual data block, and perform corresponding statistical calculation.

With reference to the second aspect, in a fifth possible implementation manner of the second aspect, the apparatus further includes a second determining unit configured to determine a location of the to-be-updated metadata, and generate a new metadata block if the to-be-updated metadata is metadata in the row group files, where the new metadata block includes a corresponding addition or deletion record result.

With reference to the fifth implementation manner of the second aspect, in a sixth possible implementation manner of the second aspect, the second determining unit includes a first deleting submodule configured to add a corresponding deletion record to a metadata block k when the deleted $k^{th}$ column exists, where the deletion record includes a column name and a deletion mark, and a second deleting submodule configured to generate a blank metadata block for a new column when the new column is added, and insert a corresponding addition record into the metadata block, where the addition record includes a column name, an addition mark, and an optional default value.

With reference to the second aspect, in a seventh possible implementation manner of the second aspect, the apparatus further includes a second processing unit, where the first determining unit configured to determine whether the to-be-updated metadata belongs to the global file metadata of the data table, and the second processing unit configured to modify a file corresponding to the global file metadata if the to-be-updated metadata belongs to the global file metadata of the data table.

A third aspect of this application provides a host, including a processor, a communications interface, a memory, and a bus, where the processor, the communications interface, and the memory complete mutual communication using the bus. The communications interface is configured to acquire to-be-updated metadata in a data table of a distributed file system. The processor is configured to execute a program, and the memory is configured to store the program, where the program is used to split data records of the data table into multiple row groups on a row basis, and convert the data table into global file metadata and multiple row group files, where the row group file includes an actual data block, a data index block, a local metadata block, a metadata index block, and a file footer, determine whether the to-be-updated metadata belongs to the global file metadata, and update local metadata if the to-be-updated metadata does not belong to the global file metadata, and add an updated local metadata block, an updated metadata index block, and an updated file footer to the multiple row group files according to updated local metadata.

In the columnar storage based on the distributed file system, the prior art does not provide an effective method for dynamically modifying metadata, but requires regeneration of an entire file. In view of this problem, according to the embodiments of the present disclosure, data records of a data table are split into multiple row groups on a row basis, and each row group is stored as an independent row group file, where the row group file includes at least an actual data block, a data index block, a local metadata block, a metadata index block, and a file footer. An updated local metadata block, an updated metadata index block, and an updated file footer are reorganized and appended according to updated local metadata using an appending feature of the file system of this type. A format of the columnar storage is reorganized, and the metadata block, the metadata index block, and the file footer are properly arranged and updated. Therefore, dynamic updating of metadata is implemented on the premise of no need for repeatedly moving most original data in the file, which dramatically saves a time of executing an updating operation of this type and needed computing resources and resolves a problem that because an effective method for dynamically modifying metadata cannot be provided in the prior art, huge computing resource overhead and time overhead need to be consumed for a metadata updating operation.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
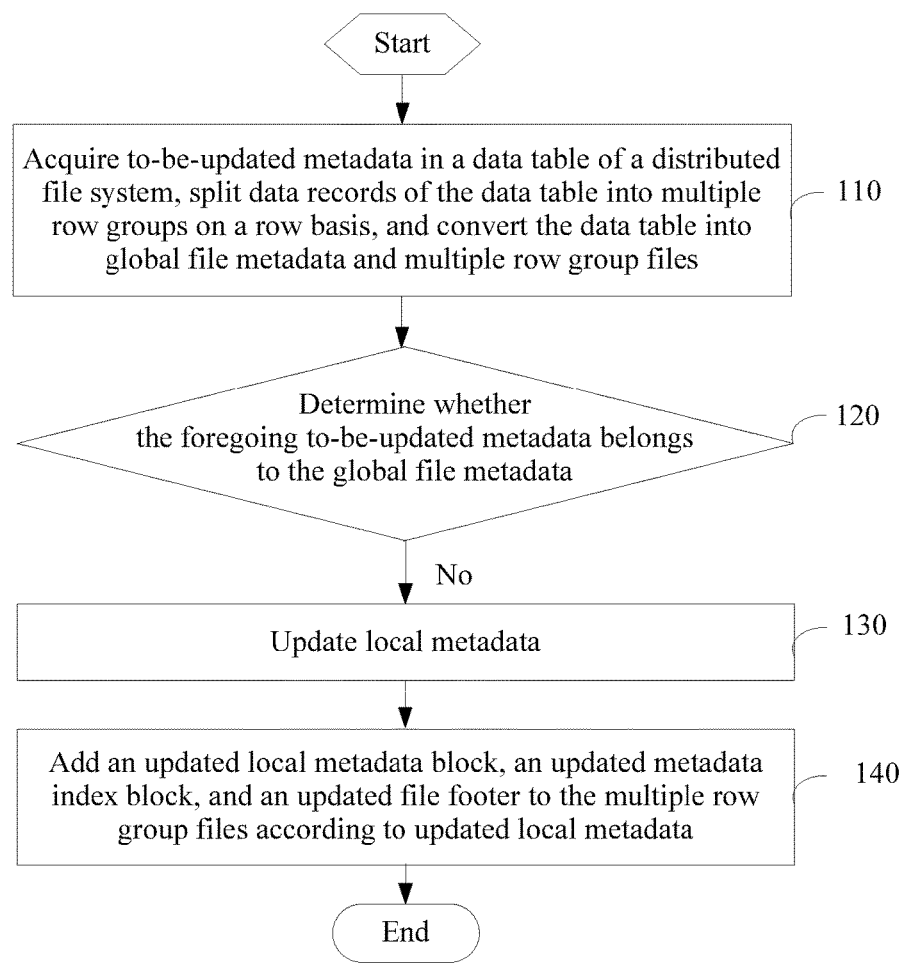
FIG. 1 is a schematic flowchart of a metadata updating method based on columnar storage in a distributed file system according to an embodiment of the present disclosure.

Referring to FIG. 1, an embodiment of the present disclosure provides a metadata updating method based on columnar storage in a distributed file system, where the method includes the following steps.

Step 110: Acquire to-be-updated metadata in a data table of the distributed file system, split data records of the data table into multiple row groups on a row basis, and convert the data table into global file metadata and multiple row group files.

The foregoing row group file includes an actual data block, a data index block, a local metadata block, a metadata index block, and a file footer.

Step 120: Determine whether the foregoing to-be-updated metadata belongs to the global file metadata, steps 130 and 140 are performed if the to-be-updated metadata does not belong to the global file metadata.

Step 130: Update local metadata.

Step 140: Add an updated local metadata block, an updated metadata index block, and an updated file footer to the multiple row group files according to updated local metadata.

According to the columnar storage based on the distributed file system, an effective method for dynamically modifying metadata is not provided in the prior art, and an entire file needs to be regenerated. In view of this problem, according to this embodiment of the present disclosure, data records of a data table are split into multiple row groups on a row basis, and each row group is stored as an independent row group file, where the row group file includes at least an actual data block, a data index block, a local metadata block, a metadata index block, and a file footer. An updated local metadata block, an updated metadata index block, and an updated file footer are reorganized and appended according to updated local metadata using an appending feature of the file system of this type. A format of the columnar storage is reorganized, and the metadata block, the metadata index block, and the file footer are properly arranged and updated. Therefore, dynamic updating of metadata is implemented on the premise of no need for repeatedly moving most original data in the file, which dramatically saves a time of executing an updating operation of this type and needed computing resources and resolves a problem that because an effective method for dynamically modifying metadata cannot be provided in the prior art, huge computing resource overhead and time overhead need to be consumed for a metadata updating operation.

Figure 2:
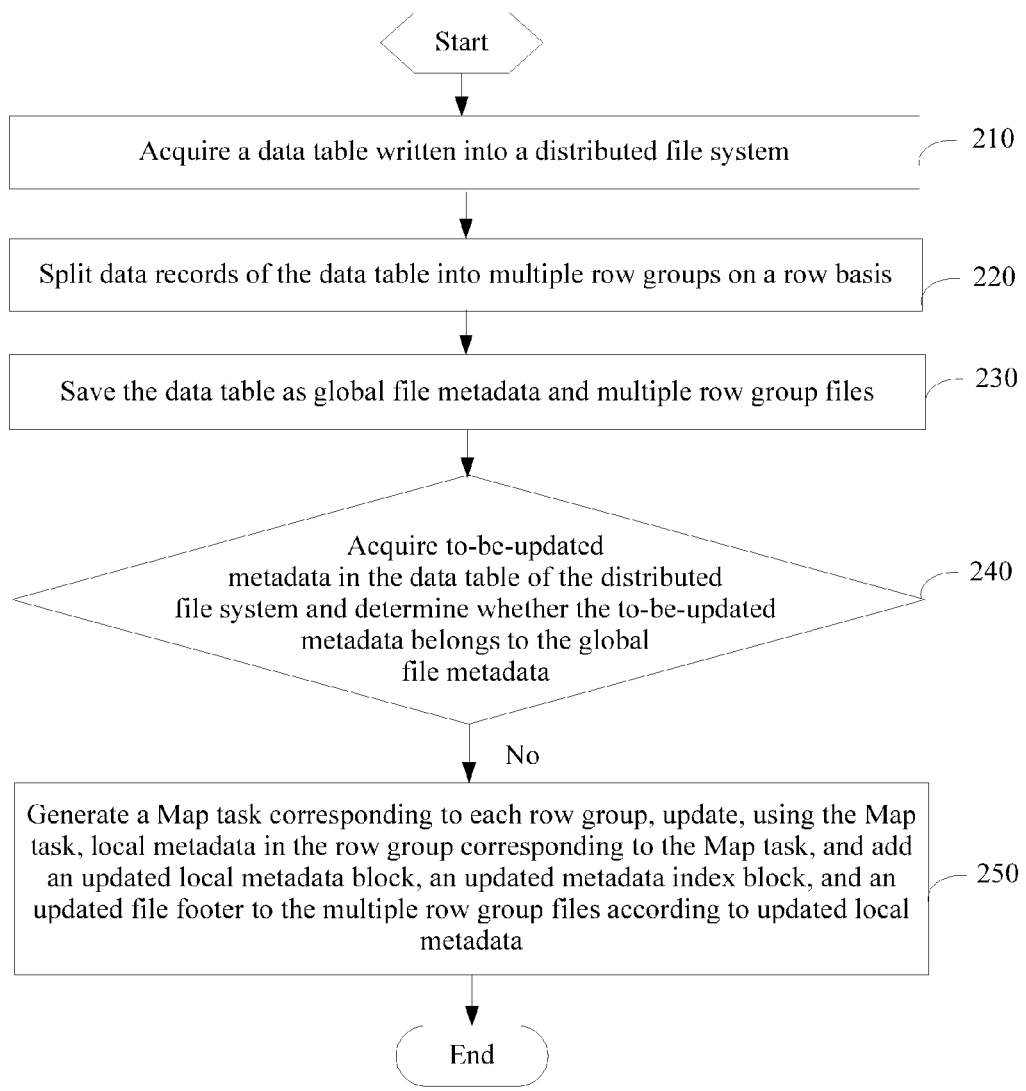
FIG. 2 is another schematic flowchart of a metadata updating method based on columnar storage in a distributed file system according to an embodiment of the present disclosure.

Referring to FIG. 2, an embodiment of the present disclosure provides a metadata updating method based on columnar storage in a distributed file system, where the method includes the following steps.

Step 210: Acquire a data table written into the distributed file system.

The distributed file system may be an append-only file system, such as a GFS or an HDFS.

Figure 3:
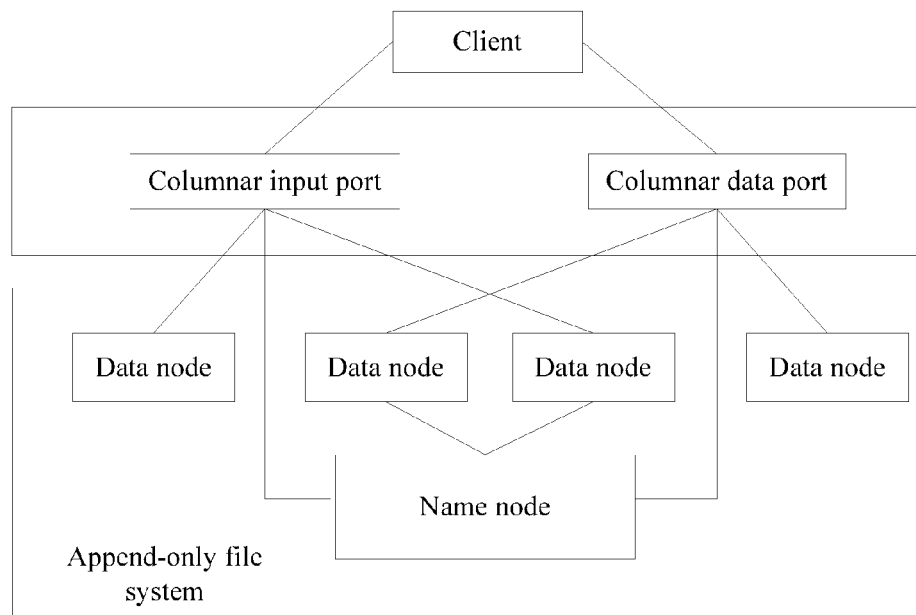
FIG. 3 is a schematic structural diagram of a system apparatus for a metadata updating method based on columnar storage in a distributed file system according to an embodiment of the present disclosure.

Referring to FIG. 3, a data table written into the distributed file system may be acquired using a client and a columnar storage module.

The client is a user interface end, and the client provides a user with an application programming interface (API), for example, an API for read/write data or update metadata, for accessing columnar storage.

The columnar storage module includes a columnar input interface and a columnar output interface. The columnar storage module is configured to implement columnar conversion on a data record. During data writing, convert a data record written by the client into a data record in a columnar storage format, and deliver the data record to an underlying file system, during data reading, reorganize, into data in a record format that is required by the user, columns of data read from the underlying file system, where the underlying file system is the append-only file system such as the HDFS.

In FIG. 3, a name node is a master server of the HDFS and stores metadata information, for example, namespace of the entire file system, a location of each data node, and distribution of an HDFS data block in each data node. The data node stores an actual data file, and data is stored per block of a fixed size. Generally, the block size is 64 megabytes (MB) by default.

Step 220: Split data records of the data table into multiple row groups on a row basis.

Each row group in the foregoing may be stored as an independent row group file, where the row group file includes an actual data block, a data index block, a local metadata block, a metadata index block, and a file footer.

Step 230: Save the data table as global file metadata and multiple row group files.

Global file metadata and multiple row group files are saved for each data table.

The global file metadata may be stored as an independent file, or may be stored in a third-party server, for example, MYSQL, where the global file metadata records definition information of the data table, for example, a column name of each column, a data type, a primary key, a foreign key, a compression type, and a compression status.

Figure 4:
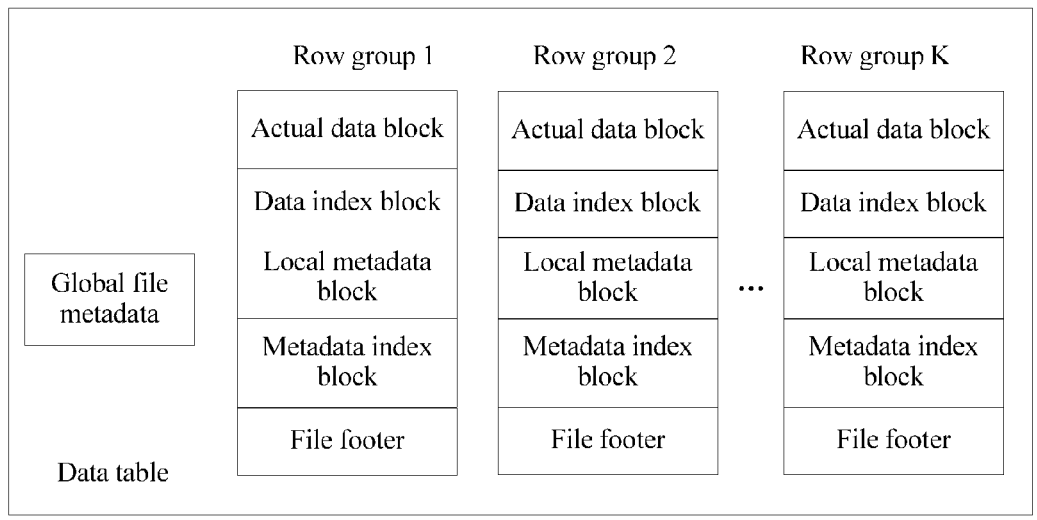
FIG. 4 is a file organization format of columnar storage according to an embodiment of the present disclosure.

The data table written into the distributed file system is converted into a file format that is shown in FIG. 4 and then is stored in the underlying file system.

The data records of the data table are split into the multiple row groups on a row basis, and each row group is stored as an independent row group file, where the row group file includes at least the actual data block, the data index block, the local metadata block, the metadata index block, and the file footer.

Figure 5:
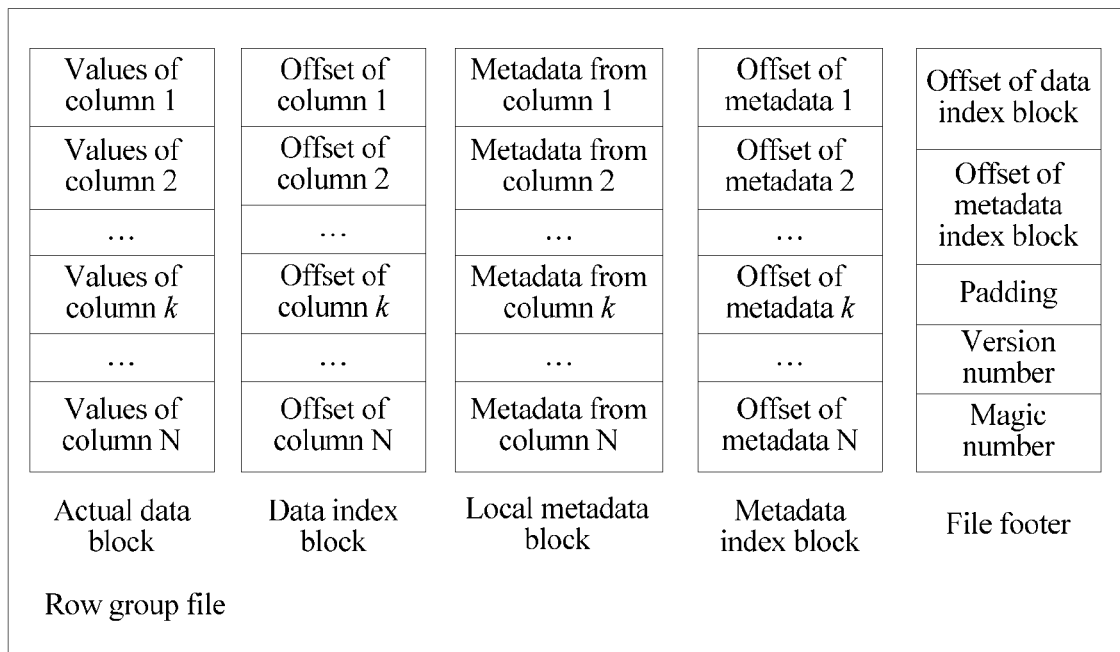
FIG. 5 is organization of blocks in an organization file according to an embodiment of the present disclosure.

Further, refer to organization of blocks in the row group file in FIG. 5.

The actual data block stores actual data of each column, and data columns are mutually separate and successively stored, that is, all data of the first column is first stored, then that of the second column and the third column is stored, and so on. The actual data in the actual data block refers to data that a file needs to store, and the actual data is data that the user semantically needs to store and that is different from metadata. For example, if a file stores 100 commodity transaction entries, the 100 transaction entries are actual data. To ensure that a transaction record can be rapidly read or updated, a file stores some additional metadata, for example, an index and an update record.

The data index block records a location offset, of each data column in the actual data block, in the row group file, that is, offset of column k, and records a file offset, of a value of the $k^{th}$ column in the actual data block, that is, values of column k, in the row group file, that is, offset of metadata k. Each column can be located using the data index block.

The local metadata block stores, for the data columns, metadata defined by the user, for example, a maximum or minimum value, numerical histogram information, and a compression dictionary.

The metadata index block stores a file offset, of metadata of each data column, in the row group file, and records a file offset, of metadata k in a metadata block, that is, metadata from column k, in the row group file. The metadata of each column can be located using the metadata index block.

The file footer has a fixed attribute and size, records file offsets in the row group file that are of the data index block and the metadata index block, padding, a version number, and a magic number. The Footer is first read to locate the data index block data and the metadata index block when a file reading operation is performed, then a specific data block may be read using the data of the columns or an offset value of metadata of the data of the columns that is recorded by the data index block data and the metadata index block.

Step 240: Acquire to-be-updated metadata in the data table of the distributed file system and determine whether the to-be-updated metadata belongs to the global file metadata. Step 250 is executed if the to-be-updated metadata does not belong to the global file metadata.

The to-be-updated metadata may be acquired according to metadata that needs to be updated and is specified by the user. Alternatively, after the actual data is updated, metadata corresponding to the actual data is updated. For example, after a data record is deleted or added, the metadata is updated. Therefore, the to-be-updated metadata in the data table of the distributed file system is acquired.

The columnar storage in this embodiment relates to two different types of metadata local metadata and global file metadata that are of a row group. Therefore, update processing on the metadata varies according to types of the metadata.

Local metadata in the row groups is to be updated if the to-be-updated metadata does not belong to the global file metadata of the data table. Because there is a large quantity of the row group files and a file size is large, a batch processing manner is used for performing, that is, a concurrent task is generated and executed to calculate the to-be-updated local metadata in the batch processing manner and complete an updating operation on the row group files.

Step 250: Generate a Map task corresponding to each row group, update, using the Map task, local metadata in the row group corresponding to the Map task, and add an updated local metadata block, an updated metadata index block, and an updated file footer to the multiple row group files according to updated local metadata.

The map task is responsible for an operation of updating the local metadata in the row group corresponding to the map task.

For a map task corresponding to each row group, each row group file can be input as a separate split to the map task by customizing a getSplits interface in a MapReduce.

The MapReduce task provided in this embodiment of the present disclosure is different from a conventional MapReduce task. A task of updating the local metadata needs only the Map task and does not need a Reduce task. No output file is additionally generated. Instead, an input file of each map is also used as a resulting output file of the map. That is, a result of the Map task is appended to the end of the input file of the Map task.

Figure 7:
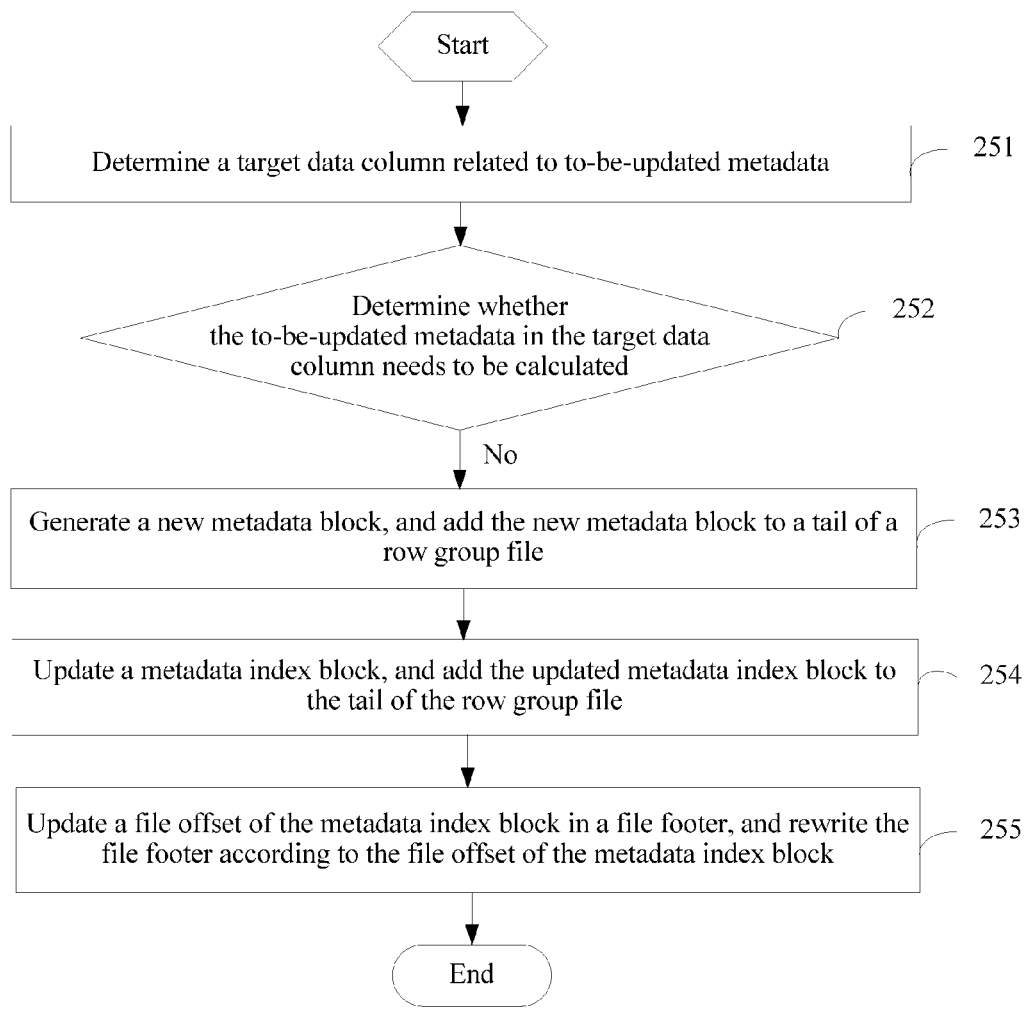
FIG. 7 is a schematic flowchart of step 250 according to an embodiment of the present disclosure.

Referring to FIG. 7, the foregoing step 250 of updating, using the Map task, the local metadata in the row group corresponding to the Map task, and adding the updated local metadata block, the updated metadata index block, and the updated file footer to the multiple row group files according to the updated local metadata may include the following steps.

Step 251: Determine a target data column related to the to-be-updated metadata.

According to columnar storage, most metadata updating operations relate to only a part of columns not all of the columns. Therefore, before a map is generated, the target data column related to the to-be-modified metadata item needs to be determined, and when the task is executed in the following, only data of the corresponding target data column needs to be read.

Step 252: Determine whether the to-be-updated metadata in the target data column needs to be calculated, steps 253, 254 and 255 are performed if the to-be-updated metadata in the target data column does not need to be calculated.

Step 253: Generate a new metadata block, and add the new metadata block to a tail of the row group file.

Step 254: Update the metadata index block, and add the updated metadata index block to the tail of the row group file.

Step 255: Update a file offset of the metadata index block in the file footer, and rewrite the file footer according to the file offset of the metadata index block.

In step 252, whether the to-be-modified metadata needs to be calculated is determined. New metadata is calculated if the to-be-modified metadata needs to be calculated, and then a new metadata block is generated according to calculated metadata. The new metadata block is added to a tail of a row group file. The metadata index block is updated. The updated metadata index block is added to the tail of the row group file. A file offset of the metadata index block in a file footer is updated. The file footer is rewritten according to the file offset of the metadata index block. Relationships between the metadata block, the metadata index block, and the file footer are as follows. A file offset of the metadata block is recorded in the metadata index block, and the file offset of the metadata index block is recorded in the file footer. Therefore, once there is new metadata to be calculated, a change may be brought to the metadata block. Therefore, a location offset of the metadata block is affected, the metadata index block needs to be updated, and then the file footer is updated.

The new metadata may be calculated by scanning all records of a data block that is corresponding to the target column in an actual data block, and performing corresponding statistical calculation. Herein, a metadata calculating process depends on a type of the metadata. For example, a calculating process is an acquisition of an average value if an average value of all values of a data column is to be calculated, the calculating process is an acquisition of a sum if a sum of data of a column is to be calculated, where corresponding calculation is implemented by the user.

Figure 6:
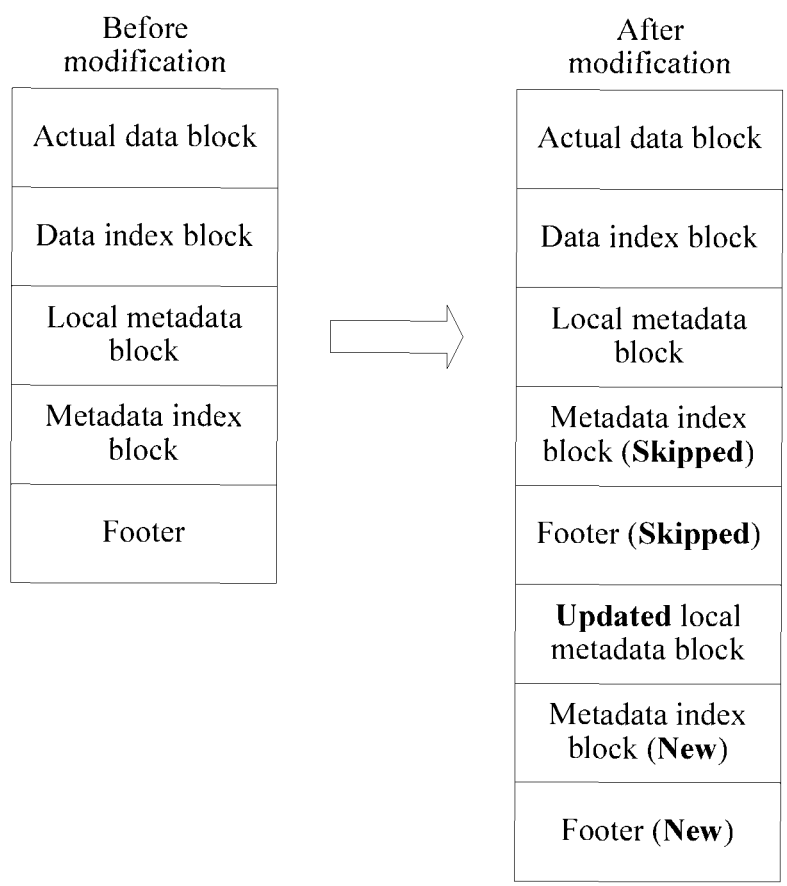
FIG. 6 is a schematic diagram of a comparison between local metadata, in a row group, before being updated and that after being updated according to an embodiment of the present disclosure.

Updating of the local metadata of a row group is completed by means of batch processing of map tasks. As the metadata block changes, the metadata index block and the file footer are correspondingly updated, and all updated data blocks are still written into the row group file according to an original order of these data blocks. FIG. 6 shows a final organization structure of an updated row group file, where a "Skipped" data block is no longer valid, an updated local metadata block includes only an updated metadata block, and a metadata block that is not updated is still stored in a local metadata block. Neither of an actual data block and a data index block data is changed in an entire process. Therefore, in a case in which the actual data block, the data index block, and a local metadata block that is not updated are not moved in the row group file, metadata updating is implemented.

Further, when the data is accessed, the file footer is first read, and then the data index block and the metadata index block are read such that a specific data block in the actual data block or in the local metadata block can be located. For example, if metadata of the third column in the updated local metadata block is updated, in this case, only new metadata 3 needs to be written.

It should be noted that writing a data table of a distributed file system does not need to be performed each time the metadata is updated, that is, the foregoing steps 210, 220, and 230 are not always needed. The steps 210, 220, and 230 may be omitted after the data table of the distributed file system is acquired.

According to the columnar storage based on the distributed file system, an effective method for dynamically modifying metadata is not provided in the prior art, and an entire file needs to be regenerated. In view of this problem, according to this embodiment of the present disclosure, data records of a data table are split into multiple row groups on a row basis, and each row group is stored as an independent row group file, where the row group file includes at least an actual data block, a data index block, a local metadata block, a metadata index block, and a file footer. An updated local metadata block, an updated metadata index block, and an updated file footer are reorganized and appended according to updated local metadata using an appending feature of the file system of this type. A format of the columnar storage is reorganized, and the metadata block, the metadata index block, and the file footer are properly arranged and updated. Therefore, dynamic updating of metadata is implemented on the premise of no need for repeatedly moving most original data in the file, which dramatically saves a time of executing an updating operation of this type and needed computing resources and resolves a problem that because an effective method for dynamically modifying metadata cannot be provided in the prior art, huge computing resource overhead and time overhead need to be consumed for a metadata updating operation.

Further, according to a feature that row group metadata relates to multiple files and a data volume is large, in the solution in the present disclosure, the metadata is calculated and updated in batches using a MapReduce task in order to improve an execution speed of a task of this type.

It should be added that, in another embodiment of the present disclosure, because according to the columnar storage, row groups are mutually independent and separately stored, updating of the row group metadata may be completed using a concurrent task in a DAG framework, where a typical DAG framework includes not only the foregoing MapReduce but also a Dryad, a Tez, and the like.

Figure 8:
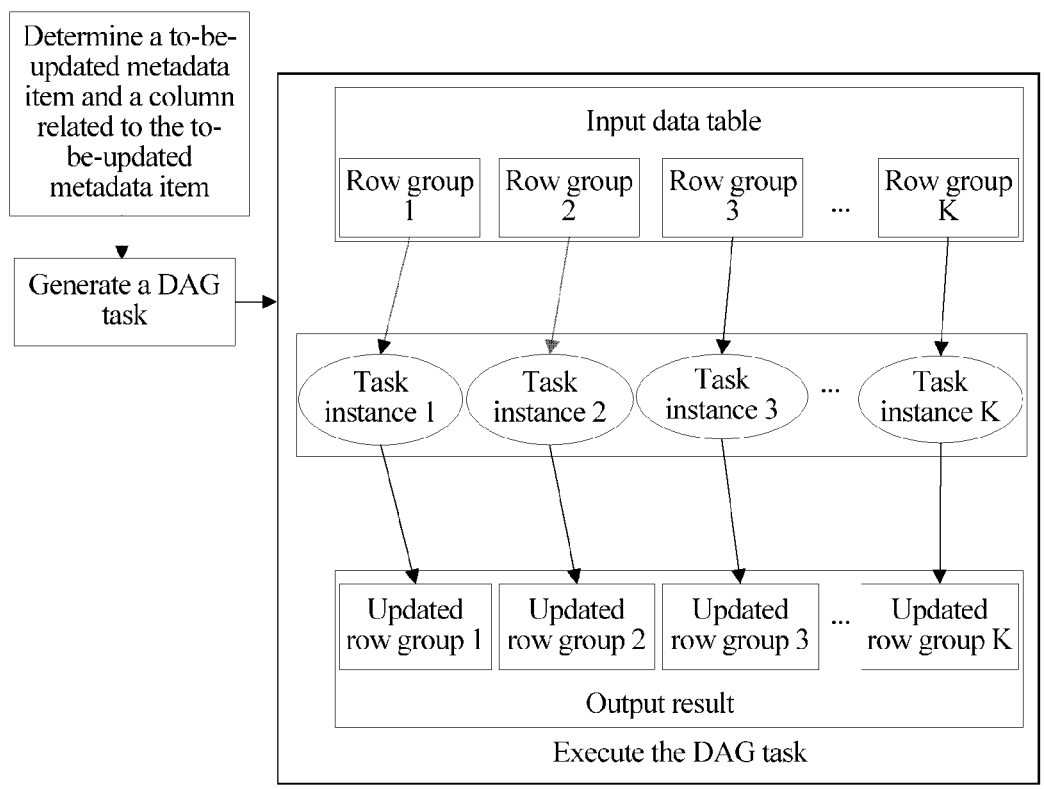
FIG. 8 is a schematic diagram of a directed acyclic graph (DAG) framework used for a task of updating row group metadata according to an embodiment of the present disclosure.

A client generates a corresponding updating program according to features of a computing framework when the foregoing framework is used for a task of updating the row group metadata, after a metadata item that needs to be updated and a column related to the metadata item are determined. Then the updating program is started in the computing framework. As shown in FIG. 8, a task instance is generated for each row group and allocated to a computing node for execution, where the task instance may be, for example, the foregoing map of the MapReduce. The task instances are concurrently executed, and calculated results of the task instances are respectively appended to ends of input row group files corresponding to the calculated results. Further, steps may be as follows.

Step 1: A task instance is allocated to each row group and used as an independent subtask to calculate and update local metadata of the row group.

Step 2: Determine whether to-be-modified metadata needs to be calculated, and first calculate a new metadata record, generate a new metadata block, and add the new metadata block to a tail of a row group file if the to-be-modified metadata needs to be calculated, or directly generate a new metadata block, and add the new metadata block to a tail of a row group file if the to-be-modified metadata does not need to be calculated.

Step 3: Read a metadata index block, and update an index of the foregoing generated new metadata block to a corresponding location in the metadata index block.

An index record for this part of the metadata is newly added behind the metadata block if the new metadata relates to a newly added column.

Step 4: Write updated metadata index block to an end of a file in which a data group is located, and record a start offset value or an index value of the updated metadata index block.

Step 5: Read a value of a file footer, and write an index value of the updated metadata index block to a corresponding location in the file footer.

Step 6: Write a new file footer to the end of the file.

Figure 9:
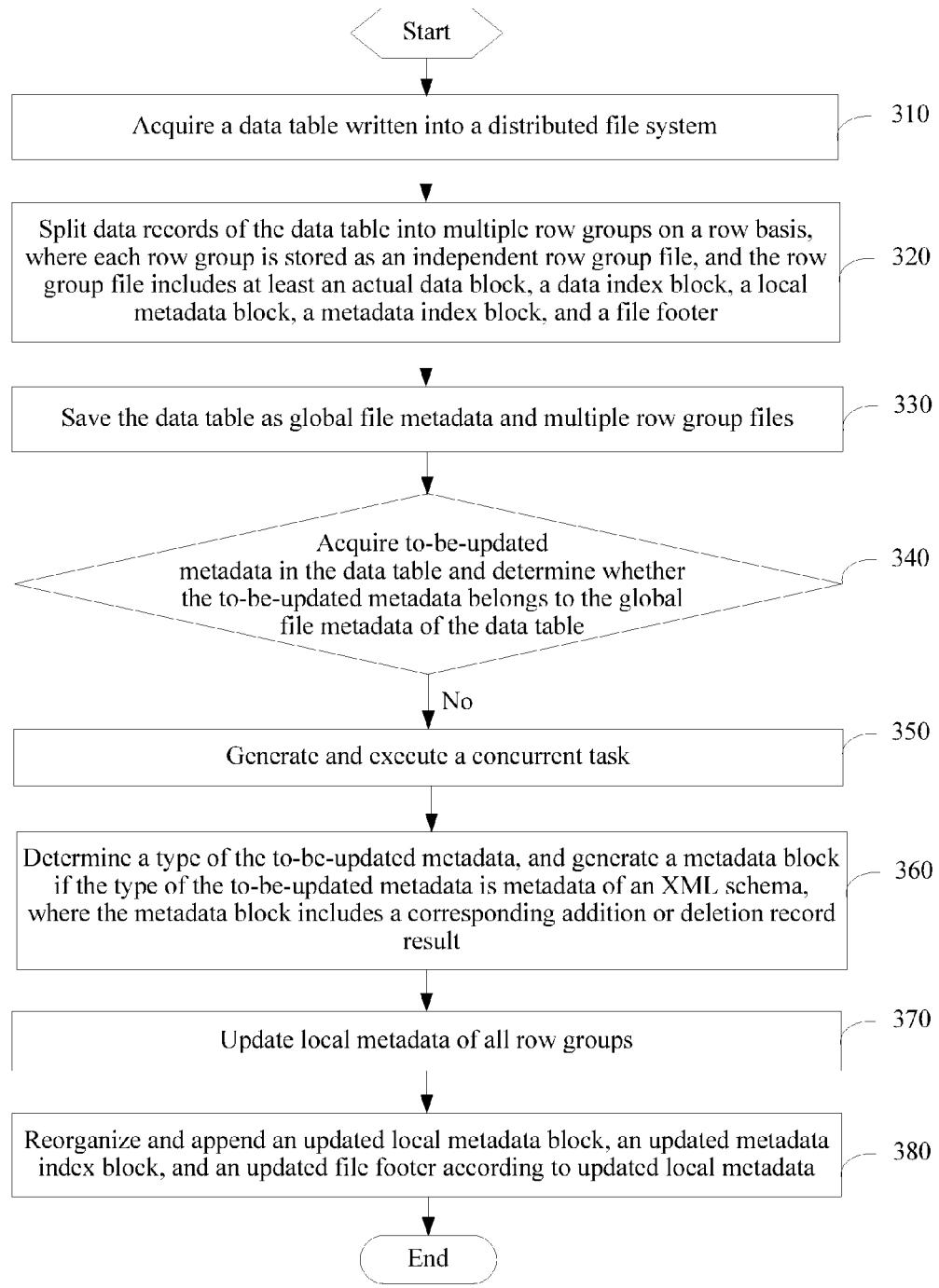
FIG. 9 is another schematic flowchart of a metadata updating method based on columnar storage in a distributed file system according to an embodiment of the present disclosure.

Referring to FIG. 9, an embodiment of the present disclosure provides a metadata updating method based on columnar storage in a distributed file system, where the method includes the following steps.

Step 310: Acquire a data table written into the distributed file system.

Step 320: Split data records of the data table into multiple row groups on a row basis, where each row group is stored as an independent row group file, and the row group file includes at least an actual data block, a data index block, a local metadata block, a metadata index block, and a file footer.

Step 330: Save the data table as global file metadata and multiple row group files.

Step 340: Acquire to-be-updated metadata in the data table and determine whether the to-be-updated metadata belongs to the global file metadata of the data table, steps 350, 360, 370 and 380 are executed if the to-be-updated metadata does not belong to the global file metadata.

Step 350: Generate and execute a concurrent task.

Step 360 Determine a type of the to-be-updated metadata, and generate a metadata block if the type of the to-be-updated metadata is metadata of an XML schema, where the metadata block includes a corresponding addition or deletion record result.

Generating the corresponding addition or deletion record result includes adding a corresponding deletion record to metadata block k when the deleted $k^{th}$ column exists, where the deletion record includes a column name and a deletion mark, generating a blank metadata block for a new column when the new column is added, and inserting a corresponding addition record into the metadata block, where the addition record includes a column name, an addition mark, and an optional default value.

Change information of the XML schema of each data group is stored in local metadata using a metadata record of a special format. Whether the column exists is first determined according to a local metadata record when a column value is read. Null is returned if the column does not exist. Whether a default value of the column exists is determined according to a local metadata record if the column exists, and the default value is returned if the default value of the column exists, or a location of the column in the data block is located using the data index block and a corresponding value is read if the default value of the column does not exist.

Step 370: Update local metadata of all row groups.

Step 380: Reorganize and append an updated local metadata block, an updated metadata index block, and an updated file footer according to updated local metadata.

SIZE denotes a current size of a to-be-updated row group file, and an initial value of SIZE is a value before the row group file is modified. That is, each newly generated metadata k is right behind a file footer of the row group file before being modified, where $1 \leq k \leq N$, N is a quantity of columns, and a size and a file offset of the metadata k are respectively represented by $size_k$ and $offset_k$.

The step of reorganizing and appending the updated local metadata block, the updated metadata index block, and the updated file footer according to the updated local metadata successively includes when $1 \leq k \leq N$, if the metadata k is updated, updating $offset_k$=SIZE, writing, into the file, the metadata k from a location of $offset_k$, updating SIZE=SIZE+$offset_k$ until all to-be-updated metadata blocks are processed, and writing the metadata index block from a location of SIZE, that is, when $1 \leq k \leq N$, successively writing a file offset value of the metadata block k, and replacing the offset value with $offset_k$ if the metadata k is updated.

The value of the file offset of the metadata index block in the file footer is updated using $offset_k$.

Figure 10:
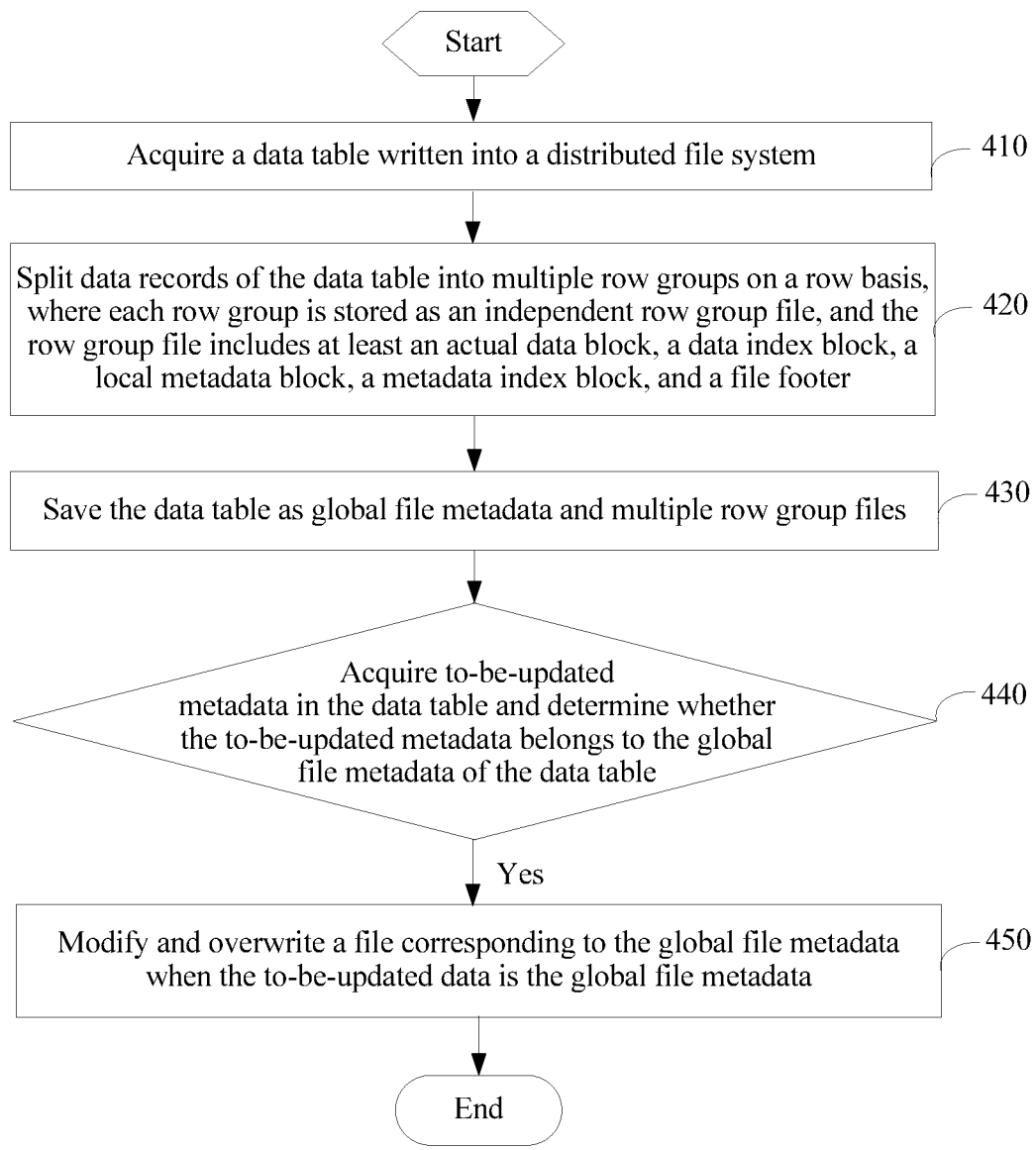
FIG. 10 is another schematic flowchart of a metadata updating method based on columnar storage in a distributed file system according to an embodiment of the present disclosure.

Referring to FIG. 10, an embodiment of the present disclosure provides a metadata updating method based on columnar storage in a distributed file system, where the method includes the following steps.

Step 410: Acquire a data table written into the distributed file system.

Step 420: Split data records of the data table into multiple row groups on a row basis, where each row group is stored as an independent row group file, and the row group file includes at least an actual data block, a data index block, a local metadata block, a metadata index block, and a file footer.

Step 430: Save the data table as global file metadata and multiple row group files.

Step 440: Acquire to-be-updated metadata in the data table and determine whether the to-be-updated metadata belongs to the global file metadata of the data table, step 450 is executed if the to-be-updated metadata belongs to the global file metadata.

Step 450: Modify and overwrite a file corresponding to the global file metadata when the to-be-updated data is the global file metadata.

If the global file metadata needs to be updated, because the global file metadata is independently stored and a data scale is relatively small and in a kilobyte (KB) level, a conventional overwriting manner may be used for updating, that is, a global file metadata file is regenerated after each update.

It should be noted that writing a data table of a distributed file system does not need to be performed each time metadata is updated, that is, the foregoing steps 310, 320, and 330 and steps 410, 420, and 430 are not always needed. After the data table of the distributed file system is acquired, the steps 310, 320, and 330 and the steps 410, 420, and 430 may be omitted.

Figure 11:
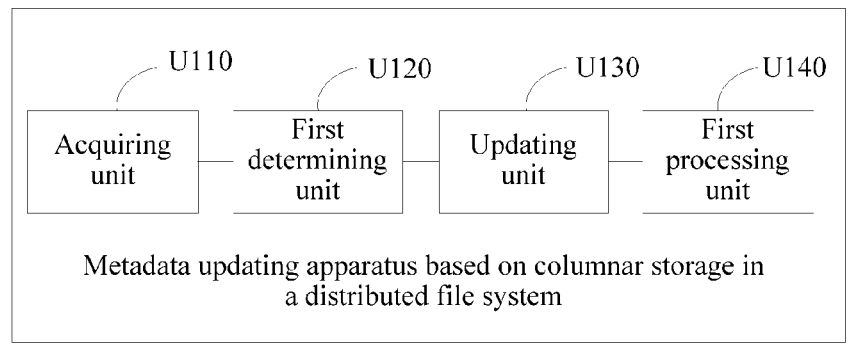
FIG. 11 is a schematic structural diagram of a metadata updating apparatus based on columnar storage in a distributed file system according to an embodiment of the present disclosure.

Referring to FIG. 11, an embodiment of the present disclosure provides a metadata updating apparatus based on columnar storage in a distributed file system, including an acquiring unit U110 configured to acquire to-be-updated metadata in a data table of the distributed file system, split data records of the data table into multiple row groups on a row basis, and convert the data table into global file metadata and multiple row group files, where the row group file includes an actual data block, a data index block, a local metadata block, a metadata index block, and a file footer, a first determining unit U120 configured to determine whether the to-be-updated metadata belongs to the global file metadata, and trigger an updating unit U130 if the to-be-updated metadata does not belong to the global file metadata, the updating unit U130 configured to update local metadata, and a first processing unit U140 configured to add an updated local metadata block, an updated metadata index block, and an updated file footer to the multiple row group files according to updated local metadata.

According to the columnar storage based on the distributed file system, an effective method for dynamically modifying metadata is not provided in the prior art, and an entire file needs to be regenerated. In view of this problem, according to this embodiment of the present disclosure, data records of a data table are split into multiple row groups on a row basis, and each row group is stored as an independent row group file, where the row group file includes at least an actual data block, a data index block, a local metadata block, a metadata index block, and a file footer. An updated local metadata block, an updated metadata index block, and an updated file footer are reorganized and appended according to updated local metadata using an appending feature of the file system of this type. A format of the columnar storage is reorganized, and the metadata block, the metadata index block, and the file footer are properly arranged and updated. Therefore, dynamic updating of metadata is implemented on the premise of no need for repeatedly moving most original data in the file, which dramatically saves a time of executing an updating operation of this type and needed computing resources and resolves a problem that because an effective method for dynamically modifying metadata cannot be provided in the prior art, huge computing resource overhead and time overhead need to be consumed for a metadata updating operation.

Figure 12:
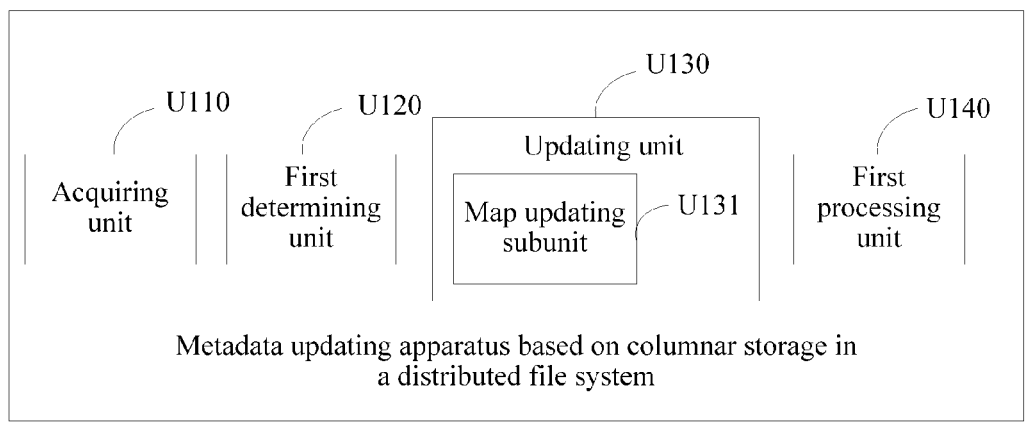
FIG. 12 is another schematic structural diagram of a metadata updating apparatus based on columnar storage in a distributed file system according to an embodiment of the present disclosure.

Further, in another embodiment of the present disclosure, referring to FIG. 12, the foregoing updating unit U130 includes a map updating subunit U131 configured to generate a Map task corresponding to each row group, and update, using the Map task, local metadata in the row group corresponding to the Map task.

Figure 13:
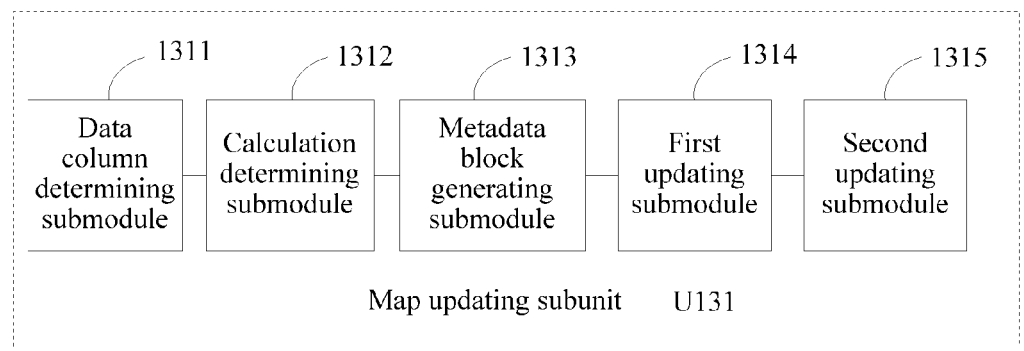
FIG. 13 is a schematic structural diagram based on a map updating subunit according to an embodiment of the present disclosure.

Further, in another embodiment of the present disclosure, referring to FIG. 13, the map updating subunit U131 includes a data column determining submodule 1311, a calculation determining submodule 1312, a metadata block generating submodule 1313, a first updating submodule 1314, and a second updating submodule 1315.

The data column determining submodule 1311 is configured to determine a target data column related to the to-be-updated metadata.

The calculation determining submodule 1312 is configured to determine whether the to-be-updated metadata in the target data column needs to be calculated, and trigger the metadata block generating submodule 1313 if the to-be-updated metadata in the target data column does not need to be calculated.

The metadata block generating submodule 1313 is configured to generate a new metadata block, and add the new metadata block to a tail of the row group file.

The first updating submodule 1314 is configured to update the metadata index block, and add the updated metadata index block to the tail of the row group file.

The second updating submodule 1315 is configured to update a file offset of the metadata index block in the file footer, and rewrite the file footer according to the file offset of the metadata index block.

Figure 14:
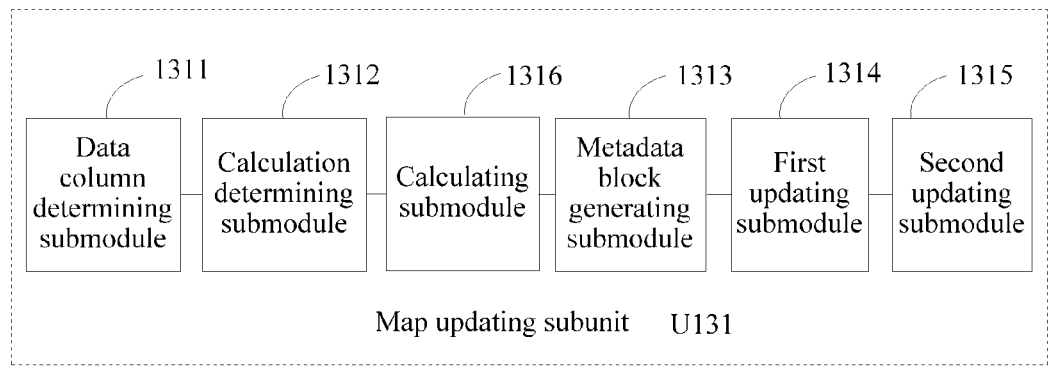
FIG. 14 is another schematic structural diagram based on a map updating subunit according to an embodiment of the present disclosure.

Further, in another embodiment of the present disclosure, referring to FIG. 14, the map updating subunit U131 includes a data column determining submodule 1311, a calculation determining submodule 1312, a calculating submodule 1316, a metadata block generating submodule 1313, a first updating submodule 1314, and a second updating submodule 1315.

The data column determining submodule 1311 is configured to determine a target data column related to the to-be-updated metadata.

The calculation determining submodule 1312 is configured to determine whether the to-be-updated metadata in the target data column needs to be calculated, and trigger the calculating submodule 1316 if the to-be-updated metadata in the target data column needs to be calculated.

The calculating submodule 1316 is configured to calculate new metadata.

The metadata block generating submodule 1313 is configured to generate a new metadata block according to calculated metadata, and add the new metadata block to a tail of the row group file.

The first updating submodule 1314 is configured to update the metadata index block, and add the updated metadata index block to the tail of the row group file.

The second updating submodule 1315 is configured to update a file offset of the metadata index block in the file footer, and rewrite the file footer according to the file offset of the metadata index block.

Further, in another embodiment of the present disclosure, the calculating submodule 1316 includes a statistics collecting submodule (not shown) configured to scan all records of a data block that is corresponding to the target data column in the actual data block, and perform corresponding statistical calculation.

Figure 15:
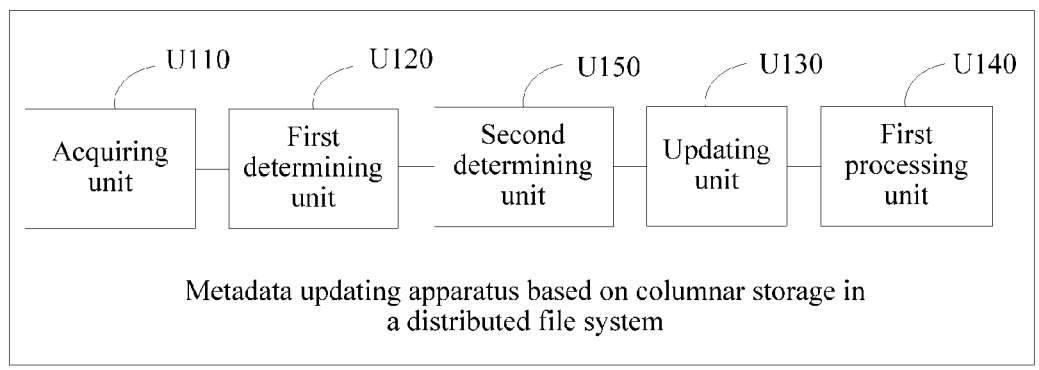
FIG. 15 is another schematic structural diagram of a metadata updating apparatus based on columnar storage in a distributed file system according to an embodiment of the present disclosure.

Further, in another embodiment of the present disclosure, referring to FIG. 15, the metadata updating apparatus based on columnar storage in a distributed file system further includes a second determining unit U150 configured to determine a location of to-be-updated metadata, and generate a new metadata block if the to-be-updated metadata is metadata in the row group files, where the new metadata block includes a corresponding addition or deletion record result.

Further, in another embodiment of the present disclosure, the second determining unit U150 includes a first deleting submodule (not shown) configured to add a corresponding deletion record to a metadata block k when the deleted $k^{th}$ column exists, where the deletion record includes a column name and a deletion mark, and a second deleting submodule (not shown) configured to generate a blank metadata block for a new column when the new column is added, and insert a corresponding addition record into the metadata block, where the addition record includes a column name, an addition mark, and an optional default value.

Figure 16:
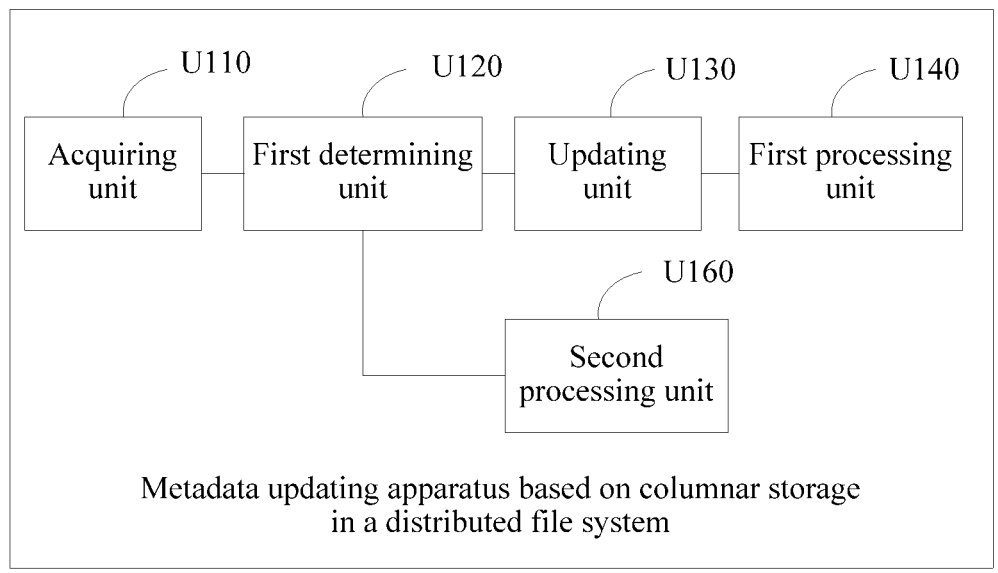
FIG. 16 is another schematic structural diagram of a metadata updating apparatus based on columnar storage in a distributed file system according to an embodiment of the present disclosure.

Further, in another embodiment of the present disclosure, referring to FIG. 16, the metadata updating apparatus based on columnar storage in a distributed file system further includes a second processing unit U160.

The first determining unit U120 determines whether the to-be-updated metadata belongs to the global file metadata of the data table, and the second processing unit U160 modifies a file corresponding to the global file metadata if the to-be-updated metadata belongs to the global file metadata of the data table.

Figure 17:
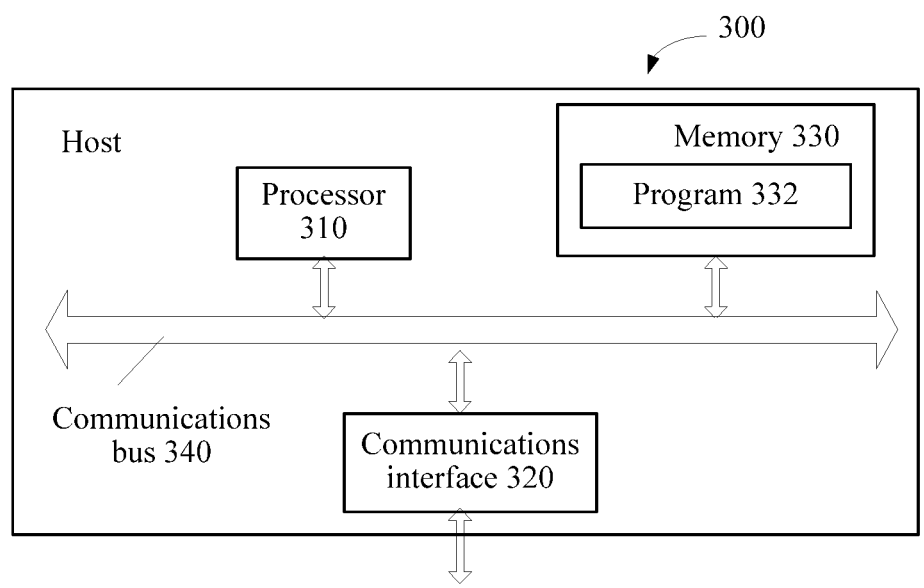
FIG. 17 is a schematic structural diagram of a host according to an embodiment of the present disclosure.

Referring to FIG. 17, an embodiment of the present disclosure provides a schematic diagram of a host 300. The host 300 may be a host server that has a computing capability, a personal computer (PC), a portable computer or terminal, or the like. A specific embodiment of the present disclosure constitutes no limitation on specific implementation of the host 300. The host 300 includes a processor 310, a communications interface 320, a memory 330, and a communications bus 340.

The processor 310, the communications interface 320, and the memory 330 complete mutual communication using the communications bus 340.

The communications interface 320 is configured to acquire to-be-updated metadata in a data table of a distributed file system.

The processor 310 is configured to execute a program 332.

Further, the program 332 may include program code, where the program code includes a computer operation instruction.

The processor 310 may be a central processing unit (CPU) or an application-specific integrated circuit (ASIC), or is configured as one or more integrated circuits that implement the embodiment of the present disclosure.

The memory 330 is configured to store the program 332. The memory 330 may include a high-speed random-access memory (RAM), and may further include a non-volatile memory, such as at least one magnetic disk memory.

The program 332 may be further used to split data records of the data table into multiple row groups on a row basis, convert the data table into global file metadata and multiple row group files, where the row group file includes an actual data block, a data index block, a local metadata block, a metadata index block, and a file footer, determine whether the to-be-updated metadata belongs to the global file metadata, and update local metadata if the to-be-updated metadata does not belong to the global file metadata, and add an updated local metadata block, an updated metadata index block, and an updated file footer to the multiple row group files according to updated local metadata.

The embodiments in this specification are all described in a progressive manner, for same or similar parts in the embodiments, reference may be made to these embodiments, and each embodiment focuses on a difference from other embodiments. The apparatus disclosed in the embodiment is basically similar to the method disclosed in the embodiment, and therefore is described briefly. For related parts, reference may be made to partial descriptions of the method.

A person skilled in the art may understand that the accompanying drawings are merely schematic diagrams of exemplary embodiments, and modules or processes in the accompanying drawings are not necessarily required for implementing the present disclosure.

A person skilled in the art may understand that the modules in the apparatuses provided in the embodiments may be arranged in the apparatuses in a distributed manner according to the description of the embodiments, or may be arranged in one or more apparatuses that are different from those described in the embodiments. The modules in the foregoing embodiments may be combined into one module, or split into a plurality of submodules.

A person skilled in the art may understand that all or a part of processing in the methods of the foregoing embodiments may be implemented by instructing related hardware by a program, where the program may be stored in a computer readable storage medium.

The embodiments disclosed are described in the foregoing to enable a person skilled in the art to implement or use the present disclosure. Various modifications to the embodiments are obvious to a person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification.

What is claimed is:

1. A metadata updating method based on columnar storage in a distributed file system, the method comprising;
    acquiring to-be-updated metadata in a data table of the distributed file system;
    splitting data records of the data table into multiple row groups on a row basis;
    converting the data table into global file metadata and multiple row group files, wherein the global file metadata comprise definition information of the data table, and wherein a row group file comprises an actual data block, a data index block, a local metadata block, a metadata index block, and a file footer; and
    determining whether the to-be-updated metadata belongs to the global file metadata, and
    wherein, when the to-be-updated metadata does not belong to the global file metadata, the method further comprises:
        updating local metadata; and
        adding an updated local metadata block, an updated metadata index block, and an updated file footer to the multiple row group files according to the updated local metadata.

2. The method according to claim 1, wherein updating the local metadata comprises:
    generating a map task corresponding to each row group; and
    updating, using the map task, local metadata in a row group corresponding to the map task.

3. The method according to claim 2, wherein updating the local metadata in the row group and adding the updated local metadata block, the updated metadata index block, and the updated file footer comprise:
    determining a target data column related to the to-be-updated metadata; and
    determining whether the to-be-updated metadata in the target data column needs to be calculated, and
    wherein, when the to-be-updated metadata in the target data column does not need to be calculated, the method further comprises:
        generating a new metadata block;
        adding the new metadata block to a tail of the row group file;
        updating the metadata index block;
        adding the updated metadata index block to the tail of the row group file;
        updating a file offset of the metadata index block in the file footer; and
        rewriting the file footer according to the file offset of the metadata index block.

4. The method according to claim 2, wherein updating the local metadata in the row group adding the updated local metadata block, the updated metadata index block, and the updated file footer comprise:
    determining a target data column related to the to-be-updated metadata; and
    determining whether the to-be-updated metadata in the target data column needs to be calculated,
    wherein, when the to-be-updated metadata in the target data column needs to be calculated, the method further comprises:
        calculating new metadata;
        generating a new metadata block according to the calculated new metadata;
        adding the new metadata block to a tail of the row group file;
        updating the metadata index block;
        adding the updated metadata index block to the tail of the row group file;
        updating a file offset of the metadata index block in the file footer; and
        rewriting the file footer according to the file offset of the metadata index block.

5. The method according to claim 4, wherein calculating the new metadata comprises:
    scanning all records of a data block that is corresponding to the target data column in the actual data block; and
    performing corresponding statistical calculation.

6. The method according to claim 1, wherein before updating the local metadata, the method comprises:
    determining a location of the to-be-updated metadata; and
    generating a new metadata block when the to-be-updated metadata is metadata in the multiple row group files, wherein the new metadata block comprises a corresponding addition record result.

7. The method according to claim 6, wherein generating the new metadata block comprises:
    generating a blank metadata block for a new column when the new column is added; and
    inserting a corresponding addition record into the metadata block, wherein the addition record comprises a column name, an addition mark, and an optional default value.

8. The method according to claim 1, wherein before updating the local metadata, the method comprises:
    determining a location of the to-be-updated metadata; and
    generating a new metadata block when the to-be-updated metadata is metadata in the multiple row group files, wherein the new metadata block comprises a corresponding deletion record result.

9. The method according to claim 7, wherein generating the new metadata block comprises adding a corresponding deletion record to a metadata block k when the deleted $k^{th}$ column exists, wherein the deletion record comprises a column name and a deletion mark.

10. The method according to claim 1, further comprising modifying a file corresponding to the global file metadata when the to-be-updated metadata belongs to the global file metadata of the data table.

11. The method of claim 1, wherein the definition information comprises at least one a column name for each column, a data type, a primary key, a foreign key, a compression type, and a compression status.

12. The method of claim 1, wherein the actual data block comprises actual data referring to data that a file needs to store, a user semantically needs to store, and is different from metadata.

13. The method of claim 12, wherein the actual data are transactions.

14. A host comprising:
a processor;
a communications interface configured to acquire to-be-updated metadata in a data table of a distributed file system;
a memory configured to store instructions that when executed by the processor cause the processor to:
split data records of the data table into multiple row groups on a row basis;
convert the data table into global file metadata and multiple row group files, wherein the global file metadata comprise definition information of the data table, and wherein a row group file comprises an actual data block, a data index block, a local metadata block, a metadata index block, and a file footer;
determine whether the to-be-updated metadata belongs to the global file metadata;
update local metadata when the to-be-updated metadata does not belong to the global file metadata; and
add an updated local metadata block, an updated metadata index block, and an updated file footer to the multiple row group files according to the updated local metadata when the to-be-updated metadata does not belong to the global file metadata; and
a bus, wherein the processor, the communications interface, and the memory complete mutual communication using the bus.

15. The host according to the claim 14, wherein the instructions further cause the processor to:
generate a map task corresponding to each row group; and
update, using the map task, local metadata in a row group corresponding to the map task.

16. The host according to the claim 15, wherein the plurality of instructions further cause the processor to:
determine a target data column related to the to-be-updated metadata; and
determine whether the to-be-updated metadata in the target data column needs to be calculated, and
wherein when the to-be-updated metadata in the target data column does not need to be calculated, the instructions further cause the processor to:
generate a new metadata block;
add the new metadata block to a tail of the row group file;
update the metadata index block;
add the updated metadata index block to the tail of the row group file;
update a file offset of the metadata index block in the file looter; and
rewrite the file footer according to the file offset of the metadata index block.

17. The host according to the claim 15, wherein the instructions further cause the processor to:
determine a target data column related to the to-be-updated metadata; and
determine whether the to-be-updated metadata in the target data column needs to be calculated, and
wherein when the to-be-updated metadata in the target data column needs to be calculated, the plurality of instructions further cause the processor to:
calculate new metadata;
generate a new metadata block according to the calculated new metadata;
add the new metadata block to a tail of the row group file;
update the metadata index block;
add the updated metadata index block to the tail of the row group file;
update a file offset of the metadata index block in the file footer; and
rewrite the file footer according to the file offset of the metadata index block.

18. The host according to the claim 17, wherein the instructions further cause the processor to:
scan all records of a data block that is corresponding to the target data column in the actual data block; and
perform corresponding statistical calculation.

19. The host according to the claim 14, wherein the instructions further cause the processor to:
determine a location of the to-be-updated metadata; and
generate a new metadata block when the to-be-updated metadata is metadata in the multiple row group files, wherein the new metadata block comprises a corresponding addition record result.

20. The host according to the claim 19, wherein the instructions further cause the processor to:
generate a blank metadata block for a new column when the new column is added; and
insert a corresponding addition record into the metadata block, wherein the addition record comprises a column name, an addition mark, and an optional default value.

21. The host according to the claim 14, wherein the instructions further cause the processor to:
determine a location of the to-be-updated metadata; and
generate a new metadata block when the to-be-updated metadata is metadata in the multiple row group files, wherein the new metadata block comprises a corresponding deletion record result.

22. The host according to the claim 21, wherein the instructions further cause the processor to add a corresponding deletion record to a metadata block k when the deleted $k^{th}$ column exists, wherein the deletion record comprises a column name and a deletion mark.

23. The host according to the claim 14, wherein the plurality of instructions further cause the processor to modify a file corresponding to the global file metadata when the to-be-updated metadata belongs to the global file metadata of the data table.

* * * * *

UNITED STATES PATENT AND TRADEMARK OFFICE
CERTIFICATE OF CORRECTION

PATENT NO. : 9,678,969 B2
APPLICATION NO. : 15/241909
DATED : June 13, 2017
INVENTOR(S) : Liqun Deng and Junhua Zhu Page 1 of 1

It is certified that error appears in the above-identified patent and that said Letters Patent is hereby corrected as shown below:

In the Claims

Column 19, Line 52, Claim 16 should read:
file footer; and

Signed and Sealed this
Twenty-sixth Day of December, 2017

Joseph Matal
*Performing the Functions and Duties of the
Under Secretary of Commerce for Intellectual Property and
Director of the United States Patent and Trademark Office*